United States Patent
Dalcourt

(10) Patent No.: US 11,065,498 B2
(45) Date of Patent: Jul. 20, 2021

(54) TUBULAR EXERCISE DEVICE

(71) Applicant: ViPR PRO, LLC, Solana Beach, CA (US)

(72) Inventor: Michol Dalcourt, Solana Beach, CA (US)

(73) Assignee: ViPR PRO, LLC, Solana Beach, CA (US)

( * ) Notice: Subject to any disclaimer, the term of this patent is extended or adjusted under 35 U.S.C. 154(b) by 14 days.

(21) Appl. No.: 16/401,002

(22) Filed: May 1, 2019

(65) Prior Publication Data

US 2020/0346065 A1    Nov. 5, 2020

(51) Int. Cl.
*A63B 21/072* (2006.01)
*A63B 21/00* (2006.01)

(52) U.S. Cl.
CPC ...... *A63B 21/0724* (2013.01); *A63B 21/0004* (2013.01); *A63B 21/4035* (2015.10)

(58) Field of Classification Search
CPC ............ A63B 21/0724; A63B 21/4035; A63B 21/0004; A63B 21/0602; A63B 21/075; A63B 23/12; A63B 21/1469; A63B 21/0603
USPC .......................................... 482/139, 106, 93
See application file for complete search history.

(56) References Cited

U.S. PATENT DOCUMENTS

| | | |
|---|---|---|
| 1,082,862 A | 12/1913 | Geschickter |
| 1,552,073 A | 9/1925 | Mansfeldt |
| 2,831,948 A | 4/1958 | Fraser |
| 3,256,015 A | 6/1966 | Perrin |

(Continued)

FOREIGN PATENT DOCUMENTS

| | | |
|---|---|---|
| CA | 2587024 | 11/2005 |
| CA | 2558330 | 3/2008 |

(Continued)

OTHER PUBLICATIONS

Supplementary European Search Report in EP Patent Application No. 07800528.7, dated May 23, 2011.

(Continued)

*Primary Examiner* — Nyca T Nguyen
*Assistant Examiner* — Andrew M Kobylarz
(74) *Attorney, Agent, or Firm* — Sheppard Mullin Richter & Hampton LLP

(57) ABSTRACT

Embodiments of the present invention are directed towards a tubular exercise device for performing loaded movement training exercises and a method of manufacturing the device. In embodiments, the device may comprise a substantially cylindrical, tubular body have flared ends that extend radially outward from the longitudinal axis providing added grip versatility and various structural benefits. In embodiments, the device may comprise one or more apertures have sides with curved indentations that are suitably shaped to facilitate the entry of one or more hands into the apertures and to increase the versatility of gripping positions. The device may comprise a thermoplastic elastomer for its rigidity and structural stability. In further embodiments, the exterior surface of the body may be textured to facilitate gripping the exterior of the surface. In embodiments, the device may comprise one or more interior ribs that provide desirable inertial properties to the device for performing various exercises.

16 Claims, 10 Drawing Sheets

(56) References Cited

U.S. PATENT DOCUMENTS

| | | |
|---|---|---|
| 3,758,109 A | 9/1973 | Bender |
| 4,199,140 A | 4/1980 | Ferretti |
| 4,538,806 A | 9/1985 | Wilkerson |
| 4,586,610 A | 5/1986 | Gandolfo |
| D287,867 S | 1/1987 | Wollersheim |
| 4,643,302 A | 2/1987 | Baumgardner |
| 4,681,171 A | 7/1987 | Kee et al. |
| 4,691,986 A | 9/1987 | Aberson et al. |
| 4,890,203 A | 12/1989 | Watson |
| 4,986,535 A | 1/1991 | Hull et al. |
| 4,995,604 A | 2/1991 | Lynch et al. |
| 5,242,350 A | 9/1993 | Chang et al. |
| 5,328,431 A | 7/1994 | Winslow |
| 5,358,262 A | 10/1994 | Roberts |
| 5,417,635 A | 5/1995 | Sell |
| 5,445,581 A | 8/1995 | Ferber |
| 5,692,996 A | 12/1997 | Widerman |
| 5,716,305 A | 2/1998 | Selsam |
| D395,210 S | 6/1998 | Almsig |
| 6,068,580 A | 5/2000 | Myers et al. |
| 6,090,021 A * | 7/2000 | Flowers ................ A63B 21/078 482/104 |
| D433,468 S | 11/2000 | Rojas et al. |
| 6,190,292 B1 | 2/2001 | Panes |
| 6,312,364 B1 | 11/2001 | Selsam |
| 6,474,858 B1 | 11/2002 | Liao |
| D469,135 S | 1/2003 | Bell |
| D505,459 S | 5/2005 | Lagattuta |
| 6,902,517 B1 | 6/2005 | Brown et al. |
| D533,413 S | 12/2006 | Wax |
| 7,169,342 B1 | 1/2007 | Brown et al. |
| D544,554 S | 6/2007 | Brun |
| 7,244,220 B2 | 7/2007 | Carney |
| D579,990 S | 11/2008 | Dalcourt |
| 7,785,243 B2 | 8/2010 | Kassel |
| 7,963,888 B2 | 6/2011 | Lutkov |
| 8,231,511 B2 | 7/2012 | Dalcourt |
| 8,727,951 B2 * | 5/2014 | Jones ................ A63B 21/0602 482/93 |
| 9,526,941 B2 | 12/2016 | Wu |
| 9,682,274 B1 * | 6/2017 | Ekstrom ............ A63B 21/0603 |
| 2004/0082445 A1 | 4/2004 | Zabel |
| 2005/0009670 A1 | 1/2005 | Scafidel |
| 2005/0018705 A1 | 1/2005 | Ohsuge |
| 2005/0187075 A1 | 8/2005 | Bellamy |
| 2006/0116256 A1 | 6/2006 | Carney |
| 2007/0042873 A1 | 2/2007 | Lutkov |
| 2007/0167298 A1 | 7/2007 | Bystrom |
| 2007/0287600 A1 | 12/2007 | Prenatt |
| 2010/0009820 A1 | 1/2010 | Dalcourt |
| 2012/0088639 A1 * | 4/2012 | Dalcourt ............ A63B 21/0724 482/93 |
| 2012/0309599 A1 | 12/2012 | Miller, Jr. |
| 2015/0151471 A1 | 6/2015 | Roctool |

FOREIGN PATENT DOCUMENTS

| | | |
|---|---|---|
| CN | 203677841 U | 7/2014 |
| WO | WO 9409856 | 5/1994 |
| WO | WO 2005075026 A1 | 8/2005 |

OTHER PUBLICATIONS

International Search Report and Written Opinion in PCT/CA2007/001503, dated Nov. 16, 2007, 7pgs.

International Preliminary Report on Patentability in PCT/CA2007/001503, dated Nov. 18, 2008, 5 pgs.

International Search Report and Written Opinion in PCT/US2012/059383, dated Jan. 22, 2013, pp. 1-4.

International Search Report and Written Opinion in PCT/US2020/030854, dated Sep. 14, 2020.

* cited by examiner

TUBULAR EXERCISE DEVICE

TECHNICAL FIELD

The present disclosure relates generally to exercise equipment, and in particular, some implementations relate to a tubular exercise device.

BACKGROUND

Loaded movement training is an increasingly popular exercise method practiced by many. Through loaded transitional and three-dimensional movement, loaded movement training enables inter-muscular training and coordination. Classic resistance and weight training, which isolate and constrain individual muscles to specific motions, offer little improvement in multi-directional stability, strength, power, and axial body movement. To compare, physical labor provides benefits in multi-directional stability, strength, power, and axial body movement. For example, farmers who labor in the field usually develop good muscle mass throughout the body due to random and varying loaded movements. Traditional exercise devices do not effectively replicate these movements, resulting in well-developed muscles in certain areas and less developed muscles in other areas.

Other weight lifting means usually involve stationary machines allowing only limited movement, which isolate certain muscles at the expense of others. Dumbbells and resistance training is typically limited to one directional motion. Moreover, typical weight lifting means are made of hard materials, which do not allow for exercises involving dropping and/or picking up of the weights as part of the exercise routine. Some solutions exist for loaded movement training; however, such solutions have limited versatility in the possible exercise routines. Further, such solutions suffer from unstable and fragile structures due to material and design constraints.

BRIEF SUMMARY OF THE DISCLOSURE

According to various embodiments of the technology, disclosed herein is a tubular device having flared ends for increasing the effectiveness of use and versatility of the device for physical exercise.

In some embodiments, the device may comprise a substantially cylindrical tubular body centered around a longitudinal axis having one or more flared ends. In implementations, the flared ends of the body extend radially outward from the longitudinal axis. In such embodiments, the flared ends may provide for greater gripping of the ends of the tube, increased versatility in possible gripping positions, as well as on-end stability when placed vertical for tilting, flipping, and balancing patterns. In implementations, the device may contain a plurality of first apertures axially spaced on the exterior surface of the body. In embodiments, each aperture may be spanned by a handle centered around the longitudinal axis.

Implementations of the device may comprise a second aperture on the exterior surface of the body. The second aperture may be spanned by a handle substantially parallel to the longitudinal axis. In various implementations, the handles may have an enhanced thickness at least greater than the thickness of the wall of the tubular body to provide more stability in gripping postures and to decrease the chance of handle failure. In certain embodiments, the exterior surface of the body may comprise a texture to facilitate gripping.

In implementations, the plurality of first apertures may each comprise a first side closest to a proximal end of the body and a second side furthest from the proximal end of the body. In specific implementations, the first side may form a curve with a crescent indentation towards the proximal end. In such embodiments, the sides of the apertures with crescent indentations are suitably shaped for the entry of hand into the aperture. In embodiments, the sides of the apertures with crescent indentations may be gripped by a user, providing greater versatility in possible gripping positions in combination with other aperture sides or the flared ends.

In certain embodiments, the handles of the first apertures may further comprise an interior handle surface substantially coplanar with the interior surface of the body and an exterior handle surface substantially coplanar with the exterior surface of the body. In such embodiments, the handles of the first apertures may be equivalent, or substantially equivalent, in thickness to the body wall. In alternative embodiments, the handles of the first apertures may further comprise an interior handle surface substantially coplanar with an interior surface of the body and an exterior handle surface raised above the exterior surface of the body. In such embodiments, the handles of the first aperture may have an increased thickness for increasing strength of the handles and accommodating various positions and ballistic exercises enabled by the present disclosure. In embodiments, the handles of the first apertures may have a curved or rounded backside that protrudes into the interior surface of body.

In certain implementations, the handle of the second aperture may comprise an exterior handle surface that extends beyond the exterior surface of the body. In such embodiments, the handle of the second aperture may have a thickness greater than the wall of the tubular body. Such increased thickness provides greater structural stability than prior solutions, preventing breakages and handle failure.

In implementations, the handle of the second aperture may comprise a curved or rounded backside. The backside of the handle of the second aperture may be suitably shaped for gripping. Additionally, the backside of the second handle may provide the handle with additional thickness, thus increasing strength of handles. Handle strength is an especially important design factor considering the various positions and high-intensity ballistic exercises enabled by the claimed features.

In implementations, the device may comprise a curved interior rib that protrudes towards the longitudinal axis along the interior surface of the body. In certain implementations, the curved interior rib may extend towards the first and second flared ends in a direction parallel to the longitudinal axis. In implementations, the curved interior rib may extend from the curved backside of the handle of the second aperture. In such embodiments, the interior rib may provide the device with greater structural stability and desirable inertial properties.

In embodiments, the device may comprise a band disposed on the exterior surface of the body adjacent to one of the flared ends. In such implementations, the band may have a color different than a color of the exterior surface to indicate the weight or other feature of the device. In implementations, the device may comprise an indentation on the exterior surface of the body to accommodate the band, such that an exterior surface of the band is substantially coplanar with the exterior surface of the body. In certain implementations, the band may be permanently fixed to the device. In other implementations, the band may be removable.

In certain embodiments, the device may be comprised of a thermoplastic elastomer. In such embodiments, a thermoplastic elastomer may provide the device with greater rigidity and structural stability, and other physical properties as described herein. In implementations, the device may be comprised of a thermoplastic elastomer and a weighting agent for an increased specific gravity. Additionally, a thermoplastic elastomer may be suitable for the manufacturing techniques discussed herein.

Disclosed herein is a method of manufacturing a device for use in physical exercise by injection molding.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

DETAILED DESCRIPTION

Embodiments of the device and methods disclosed herein may provide a substantially tubular exercise device for physical exercise. In implementations, the device disclosed herein may be particularly suited for free weight and loaded movement training. This present disclosure is capable of being embodied in various forms. The description below of several embodiments is made with the understanding that the present disclosure is to be considered as an exemplification of the claimed subject matter and is not intended to limit the claims to the specific embodiments illustrated.

Figure 1:
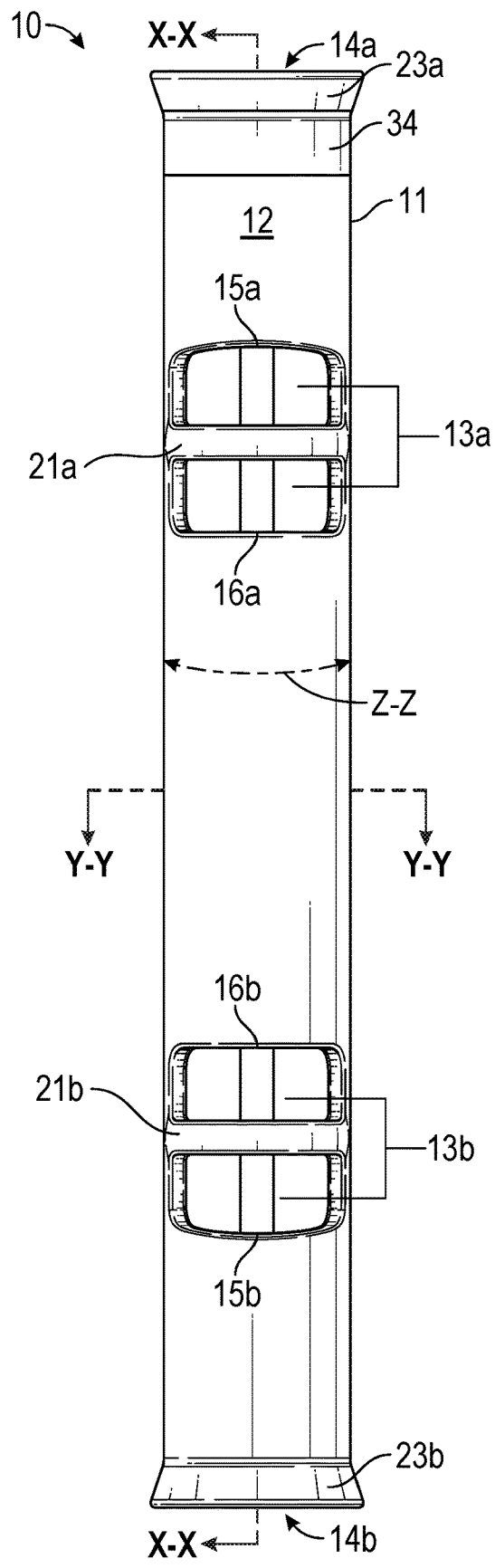
FIG. 1 illustrates a front view of the device showing two apertures and handles in accordance with the various embodiments disclosed herein.
Figure 2:
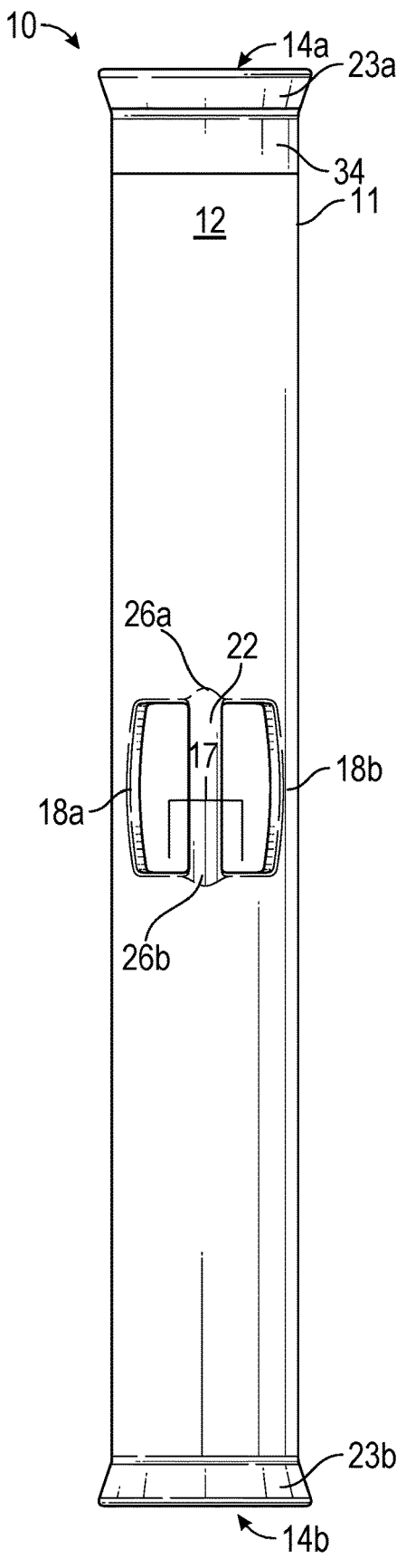
FIG. 2 illustrates a rear view of the device showing a single aperture and handle in accordance with the various embodiments disclosed herein.

FIG. 1 and FIG. 2 depict an embodiment of exercise device 10. FIG. 1 is a view of the body 11 and exterior surface 12 of device 10 and FIG. 2 is a view of the same device 10 showing the opposite side of exterior surface 12. In certain embodiments, device 10 may be in the shape of an elongated tube. In particular embodiments, device 10 may have a substantially cylindrical tubular body 11. For example, device 10 may be a hollow cylinder having two ends 14a and 14b, an exterior surface 12, an interior surface 30, and wall thickness. Although FIG. 1 illustrates device 10 as having a substantially cylindrical tubular body, device 10 may have a tubular body in any shape as would be consistent with the present disclosure, including but not limited to, an elliptical cylinder or an elongated rectangle.

In embodiments, the body 11 of exercise device 10 may be substantially cylindrical. The body 11 of exercise device as used herein refers to the portion of the exercise device between the ends 14. The term "substantially cylindrical," as used herein, means that the body may have the general shape of a cylinder, notwithstanding any features or protrusions on the surface 12 of the body 11 or manufacturing tolerances.

Device 10 may be centered about longitudinal axis X-X and may have a radial axis Y-Y. In an exemplary embodiment, apertures 13a and 13b may be aligned along an axis parallel to the longitudinal axis X-X. In implementations, apertures 13a and 13b may be spaced equidistance from the center of the device 10 along the longitudinal axis X-X.

In certain implementations, device 10 may be made from a thermoplastic elastomer (TPE). TPE's may be selected for their rigidity and structural stability. Indeed, prior art solutions using rubber, for example, suffer from broken handles and loss in structural integrity due to the quick, repeated motions required for certain loaded movement exercise routines. According to one embodiment, a thermoplastic elastomer may be selected from the group consisting of styrenic block copolymers, thermoplastic polyolefins, polyolefins blends, thermoplastic vulcanisates, thermoplastic copolyesters, and thermoplastic polyether block amides. In various embodiments, device 10 may comprise one or more algae-based polymers, blends, or composites In certain embodiments, the exterior surface 12 of device 10 may comprise a plurality of first apertures 13. In the example shown in FIG. 1, device 10 may comprise aperture 13a and aperture 13b formed from the wall of device 10. In embodiments, apertures 13 may be formed from a recess on exterior surface 12. Apertures 13 may each have a proximal side 15 that is nearest to one of the ends 14 and a distal side 16 that is furthest from the same end. For example, aperture 13a may have proximal side 15a that may be closest to end 14a and a distal side 16a that may be further from end 14a. In this particular embodiment, distal side 16a is closer than proximal side 15a to the opposite end 14b. In implementations, apertures 13 may be capable of receiving a handle 21 for holding, moving, or interacting with device 10.

Handles 21 may span across the apertures 13 such that the handles 21 span in a direction substantially perpendicular to the longitudinal axis X-X. In embodiments, each of the handles 21 may be substantially aligned with an arc Z-Z which is centered around and normal to the longitudinal axis X-X. In specific implementations, handles 21 may be approximately shoulder-width distance apart from each other.

In embodiments, handles 21 may bisect apertures 13. For example, handle 21a may bisect aperture 13a in the particular embodiment illustrated in FIG. 1. In this implementation, aperture 13a may be divided by handle 21a into two portions. However, one of ordinary skill in the art would appreciate that many orientations for handles 21 are possible including, for example, placing handles 21 such that they dissect apertures 13 at a location closer or further along the longitudinal axis to one of the ends 14a or 14b, or in some implementations, the apertures 13 may not be spanned by a handle.

The handles 21 may be formed by material extending from the body 11 of device 10, thereby forming a smooth extension of the external surface 12 across the aperture 13. In embodiments, the handles 21 may be a continuous portion of the body 11, that is, the handles 21 may form part of the body 11. In such implementations, the material of handles 21 may be the same as the body 11 of device 10, such as a TPE. In alternative embodiments, handles 21 may be removably connected to the body 11 of device 10. In such embodiments, the material of handles 21 may be the same as the body 11 of device 10, such as a TPE, or a different material from the body 11.

Figure 5:
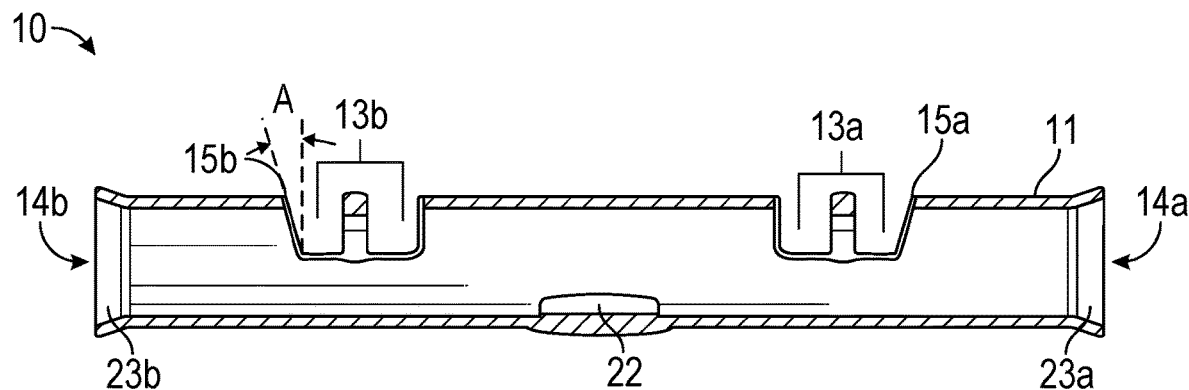
FIG. 5 illustrates a cross sectional side view of the device without an interior rib in accordance with the various embodiments disclosed herein.

In exemplary embodiments, apertures 13 and handles 21 may be suitably shaped for gripping the handles 21 for holding or interacting with the device 10. For example, the apertures 13 as shown may have rounded edges on the proximal sides 15, thereby facilitating entry of a hand into apertures 13 and allowing a more comfortable grip. As depicted in FIG. 1, distal side 16a of aperture 13a may be a radially-outwardly-opening side substantially aligned with an arc Z-Z and proximal side 15a may be a radially-outwardly-opening side having a crescent indentation towards and proximal to the end 14a. For example, FIG. 5 illustrates an example angle A of the crescent indentation of proximal side 15a towards and proximal to the end 14a.

Figure 10:
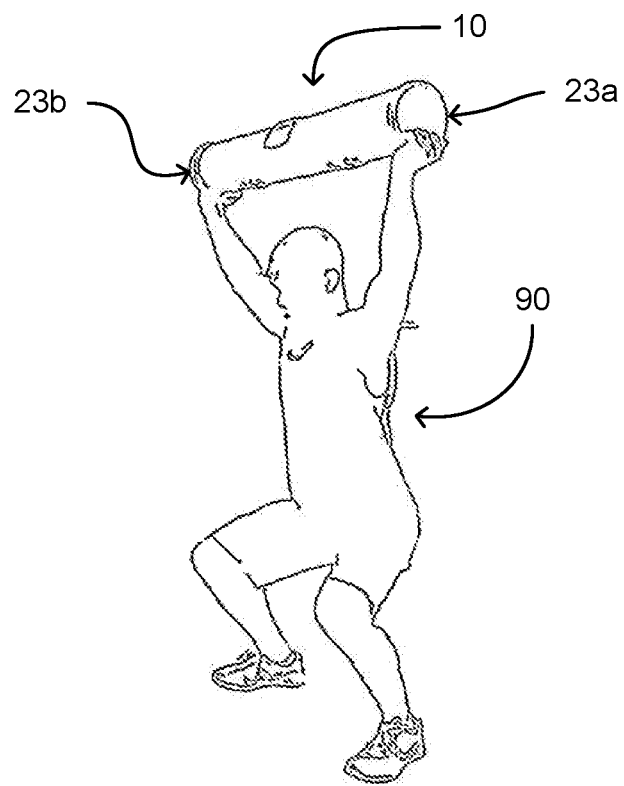
FIG. 10 illustrates a first exercise position using the device in accordance with the various embodiments disclosed herein.

The multitude of physical exercise techniques and routines enabled by the device 10 may demand quick and secure operation of handles 21. For example, certain exercises may require quickly gripping and releasing one or more of the handles 21. The crescent indentation of the proximal sides 15 accommodates the quick entry and escape of hands through the outside portion of apertures 13 closest to the ends 14 by tolerating hand movement through aperture 13 that is not directly orthogonal to the longitudinal axis X-X. Even further, the crescent indentation of the proximal sides 15 not only facilitates interaction with handles 21, but also facilitates gripping the proximal sides 15 themselves due to the flared, angled and curved shape. Thus, the addition of the crescent indentation of the proximal sides 15 has the surprising effect of creating more effective handles on the device 10 without having to create additional apertures 13, as exemplified in FIGS. 10-117. As one of ordinary skill in the art would appreciate, the size, shape, and angle of the crescent indentation of the proximal sides 15 may be adjusted to accommodate different loads, exercise techniques, sizes of device 10, and other factors relevant to the design of device 10 as disclosed herein.

As shown in the embodiment illustrated in FIG. 2, exterior surface 12 may comprise an additional aperture 17. In certain implementations, the additional aperture 17 may be formed from the exterior surface 12 of the device 10 opposite to the pair of apertures 13a and 13b shown in FIG. 1. The additional aperture 17 is not limited to any particular location on the body 11 of the device 10. Indeed, in certain implementations, the additional aperture 17 may be aligned with apertures 13. The additional aperture 17 may be formed by a recess on the exterior surface 12, having sides 18a and 18b. In certain implementations, additional aperture 17 may be longitudinally intermediate of the pair of apertures 13a and 13b. In other embodiments, the additional aperture 17 may be at any other location on the exterior surface 12 with respect to the apertures 13.

Handle 22 may extend from the body 11 of device 10 and may be substantially parallel with the longitudinal axis X-X. In embodiments, handle 22 may be a continuous portion of the body 11, that is, handle 22 may form part of the body 11. In embodiments, handle 22 may have a thickness that is greater than the thickness of the wall of the body 11 of device 10. In embodiments, handle 22 may be raised above the exterior surface 12 of the device 10, thus permitting the additional handle thickness. For example, handle 22 may be slightly raised at the ends 26a and 26b of handle 22. In certain implementations, ends 26a and 26b may have a slight rounded bulge from exterior surface 12 as shown in FIG. 2 to provide height and a comfortable grip to handle 22.

In implementations, handle 22 may be rounded to facilitate gripping. For example, handle 22 may be curved along its top and sides to provide a comfortable gripping position. Additionally, and as discussed in more detail below, handle 22 may be curved on its backside such that the curved backside of handle 22 extends past the interior surface 30 of the device 22. In such implementations, handle 22 provides a more comfortable and stable gripping position.

In certain embodiments, sides 18a and 18b may be curved. In certain implementations, sides 18a and 18b may be curved and open along arc Z-Z to facilitate the entry of a hand in either side of aperture 17. For example, side 18a of aperture 17 is shown to be curved along arc Z-Z. That is, the distance from side 18a to handle 22 may increase in a direction along arc Z-Z with respect to the longitudinal axis. Additional, sides 18a and 18b may be opened at an angle along arc Z-Z. Thus, there is more space between side 18a and handle 22 to accommodate the entry of one or more hands. Even further, the curves of sides 18 are suitably shaped for grabbing. Thus, each of the sides 18 acts as an additional effective handle on the body 11 of device 10. In implementations, side 18b may be an identical, mirror image of side 18a. In alternative embodiments, side 18b may be curved in a different manner than side 18b. As one of ordinary skill in the art would appreciate, the size, shape, and angle of the curve in sides 18 may be adjusted to accommodate different loads, exercise techniques, sizes of device 10, and other factors relevant to the design of device 10 as disclosed herein.

In various embodiments, the body 11 of device 10 may have two flared ends 23a and 23b. Flared ends 23a and 23b may extend radially outward beyond the exterior surface 12. For example, flared ends 23 may have raised edges, such that the diameter at the outermost plane of the flared ends 23 is larger than the diameter of the tubular portion of the body 11.

Flared ends 23 may also be rounded around the top to support comfortable gripping. For example, in certain exercise positions, it may be desirable for a user to grip the body 11 such that the hand of the user enters the interior of the body 11 through the ends 14 while the thumb remains against the exterior surface 12 along the arc Z-Z at the base of the flared ends 23. In such a position, flared ends 23 act as a support against the thumb providing a more comfortable and stable grip. In alternative positions, a user may grip the exterior surface 12 of the body 11 with one or two hands such that the user hands are substantially aligned with arc Z-Z. In such positions, flared ends 23 act as a stop to provide further support and to prevent the body 11 from sliding out of the user's hands.

Figure 17:
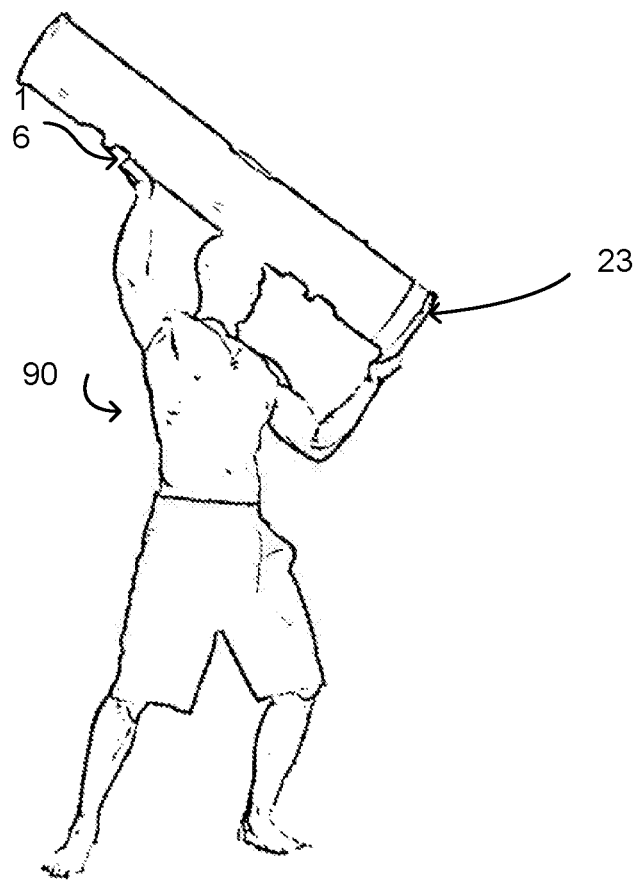
FIG. 17 illustrates an eight exercise position using the device in accordance with the various embodiments disclosed herein.

Flared ends 23 also permit a more stable upright position of device 10. As shown in FIG. 2, flared ends 23 create a normal force acting towards the center of the device 10 resulting in a more stable upright position. Such stability not only enables the device 10 to act more effectively as a stationary obstacle used in an exercise routines, but also enables positions where a user may apply tilt and apply weight to the device 10 as it stands upright. In accordance with this design advantage, flared ends 23 may prevent the deformation of the body 11 of device 10 due to its increased structural stability. Indeed, prior art solutions, due to both material and design constrains, lack the structural stability afforded by the flared end design. In implementations, flared ends 23 may be rounded so that the device 10 may be rolled on a surface. In certain scenarios, it may be beneficial for the device 10 to roll with only one end 23b touching the ground, as shown in FIG. 17. In such embodiments, the flared ends 23 facilitate a controlled rolling motion of device 11.

Thus, in accordance with the embodiments disclosed herein, flared ends 23 increase stability and create additional effective handles and positions by which a user can interact with device 10. Not only can flared ends 23 act as a pair of individual handles supporting wider orientations than handles 21, but flared ends 23 may be gripped in combination with at least one or more of handles 21 and 22 and their respective sides. Thus, the addition of flared ends 23 creates a surprising degree of flexibility in choosing different combinations of handles for different exercise positions or routines.

Prior art solutions only permit user's to grab handles. While pluralities of handles may have been contemplated by prior solutions, they suffer from practical design limitations. For example, the addition of more handles may requires the addition of more apertures, which would decrease the weight and structural stability of the body. In accordance with the embodiments described herein, flared end 23 provide additional effective handles to device 10, in addition to other features, without suffering from the functional limitations of prior solutions.

In a specific implementation, flared ends 14a and 14b may extend radially outward at an angle of approximately 26 degrees from the longitudinal axis X-X. In certain, implementations, flared ends 14a and 14b may extend radially outward at an angle of approximately 20-30 degrees or 5-60 degrees from the longitudinal axis X-X. As one of ordinary skill in the art would appreciate, the size, shape, and angle of flared ends 23 may be adjusted to accommodate different loads, exercise techniques, sizes of device 10, and other factors relevant to the design of device 10 as disclosed herein.

Figure 3:
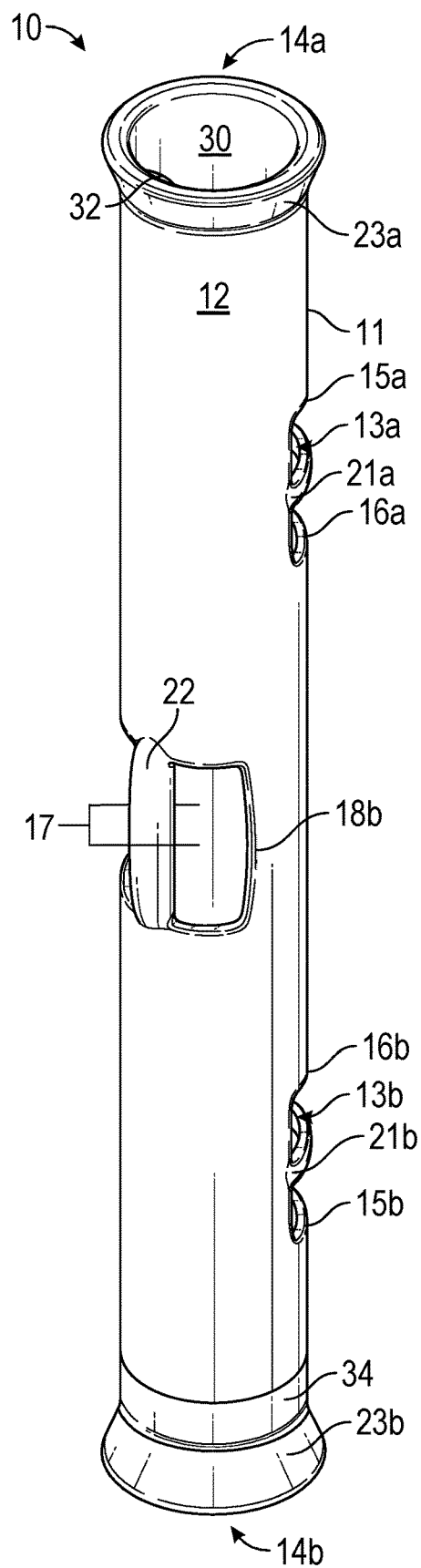
FIG. 3 illustrates a rear isometric view of the device in accordance with the various embodiments disclosed herein.
Figure 4:
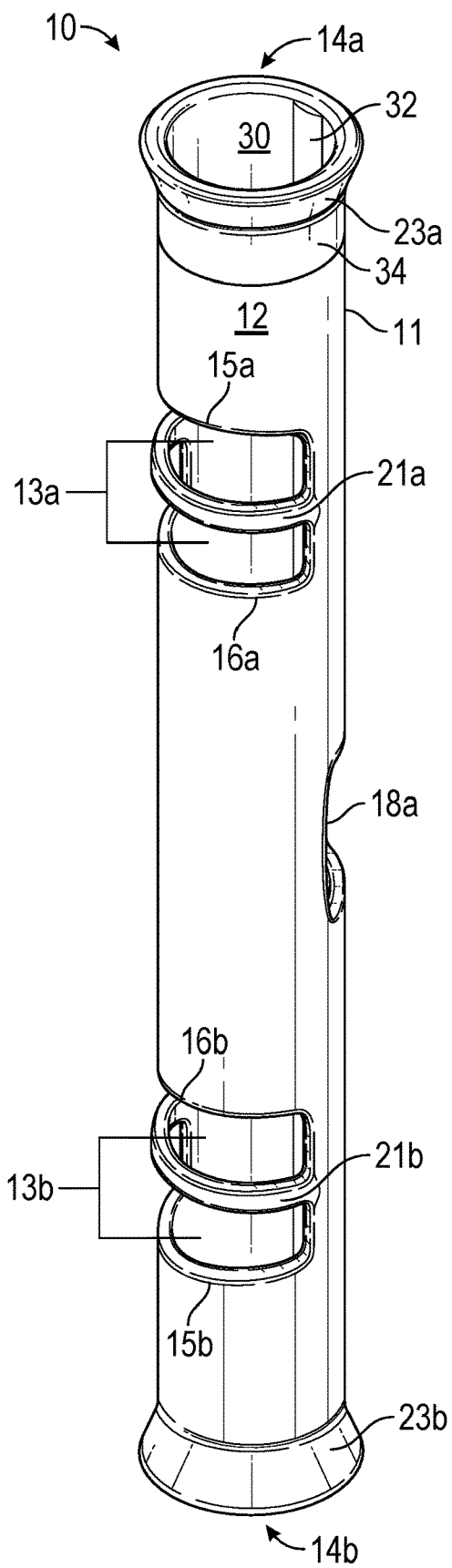
FIG. 4 illustrates a front isometric view of the device in accordance with the various embodiments disclosed herein.

FIG. 3 and FIG. 4 illustrate isometric views of an embodiment of device 10. In accordance with embodiments disclosed herein, the body 11 of device 10 may have a pair of first apertures 13 on the exterior surface 12 and an additional aperture 17 on a side of the exterior surface 12 opposite to the first apertures 13. As described herein, certain embodiments may include of flared ends 23 on each end 14 of the device 10.

As discussed above, handle 22 may comprise a rounded backside extending at least partially past the interior surface 30 of the body 11 of device 10. In certain implementations, the rounded backside of handle 22 may extend vertically along the interior surface 30 to the ends 14 of the body 11, forming an interior rib 32.

Interior rib 32 may be a curved protrusion disposed on the interior surface 30 of the device 10. As shown in FIG. 4, interior rib 32 may extend in a direction parallel to the longitudinal axis X-X. In certain implementations, interior rib 32 may be an elongation of the curved backside of handle 22. That is, interior rib 32, may be identical in its radius and shape as the curved backside of handle 22. In alternative implementations, interior rib 32 may be distinct in its radius and shape compared to the curved backside of handle 22. In certain implementations, a plurality of interior ribs 32 may be disposed on the interior surface 30 or exterior surface 12 of device 10. In certain implementations, interior rib 32 may comprise the same material as the body 11, such as TPE. In other implementations, interior rib 32 may comprise a different material than TPE to increase the functional characteristics of interior rib 32 as discussed herein. In implementations, interior rib 32 may be a continuous extension of the body 11. In alternative implementations, interior rib 32 may be removably attached to the body 11 on either the interior or exterior surface. In specific embodiments, the interior 32 rib may have a radius of approximately 152 millimeters.

Interior rib 32 may increase the center of gravity of the device 10 towards the perimeter of the body 11. For example, the added material of interior rib 32 provides additional weight along the perimeter of the body 11, thus increasing the rotational inertia of device 10. In embodiments where the interior rib 32 is aligned with handle 22, the added weight of interior rib 32 provides added rotational stability around handle 22, improving user experience in handling the device 10 by handle 22. Further, as discussed herein, device 10 may have an imbalanced number of apertures on the different sides of the exterior surface 12, thus creating the possibility of uneven weight distribution. One or more interior ribs 32 may be disposed on the interior surface 30 of the device 10 to adjust the center of gravity of the device 10 accordingly to provide balance. Thus, the addition of interior ribs 32 improves the rotational and inertial properties of device 10 by concentrating additional weight along the perimeter of body 11 of device 10. Further, interior rib 32 provides additional axial and structural stability to the device, further preventing deformation or loss of structural integrity.

Referring to FIG. 3 and FIG. 4, embodiments of device 10 may contain a band 34 for indicating one or more properties of device 10. In one embodiment, band 34 may be substantially aligned with arc Z-Z such that band 34 wraps around the exterior surface 12 of device 10. In implementations, band 34 may have a color different than the color of exterior surface 12 to indicate the weight of the device 10. In certain embodiments, band 34 may comprise a material that is the same as body 11, such as TPE. In other embodiments, band 34 may be a suitable elastic material for wrapping around the body 11 of device 10.

As explained herein, various implementations of device 10 are possible, including implementations with different sizes or weights. Band 34 may indicate, for example, the weight or size of device 10. In one embodiment, for example, band 34 may be grey and exterior surface 12 may be black. In other implementations, band 34 may indicate one or more other properties of device 10 such as, but not limited to, the radius of the device, the size or degree of the flared ends 23, the specific density of the device 10, the number of handles on device 10, or a length of device 10. The color and position of band 34 is not intended to be limited by the present disclosure and drawings. Although band 34 is shown having a given width at the base of one of flared ends 23, band 34 may be positioned anywhere along the exterior surface 12 of the device 10 and may be any size or color as would be appreciated by one having ordinary skill in the art.

In certain embodiments, band 34 may be substantially coplanar with the exterior surface 12. In some embodiments, exterior surface may have an indentation sized to accommodate band 34. In such implementations, band 34 may fit in such indentation such that the exterior surface of band 34 is substantially coplanar with exterior surface 12. In embodiments, band 34 may be permanently attached to the body 11 of device 10. In other embodiments, band 34 may be removably attached to the body 11 of device 10 so that it can be replaced easily upon being damaged or to replace with a different band that indicates a different property of the device 10. In certain implementations, band 34 may comprise multiple colors to indicate multiple properties or characteristics of device 10 as discussed herein.

FIG. 5 illustrates a side cross sectional view of device 10. As explained above, proximal sides 15 may comprise a crescent indentation to accommodate the entry of a hand into apertures 13 or to act as a grip. In certain implementations, the flared design of proximal sides 15 may have an angle A of approximately 10 to 30 degrees with respect the radial axis Y-Y. As one of ordinary skill in the art would appreciate, the size, shape, and angle of proximal sides 15 may be adjusted to accommodate different loads, exercise techniques, sizes of device 10, and other factors relevant to the design of device 10 as disclosed herein. Additionally, distal sides 16 may have a crescent indentation reflective of features of proximal sides 15. Indeed, all of the features of each of the aperture's sides, as discussed herein, may be applied to any side of the apertures 13 and 17.

Figure 6:
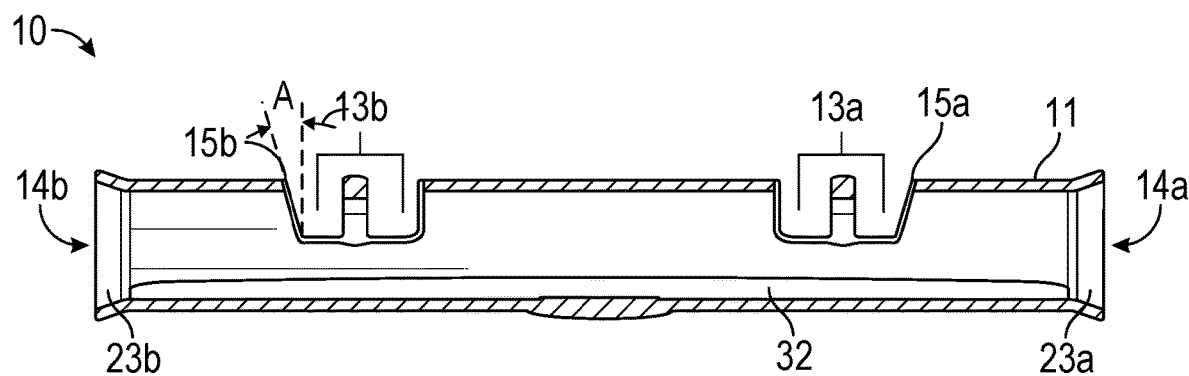
FIG. 6 illustrates a cross sectional side view of the device with an interior rib in accordance with the various embodiments disclosed herein.

FIG. 6 illustrates a side cross sectional view of device 10 having an interior rib 32. In embodiments, interior rib 32 may protrude past the interior surface 30 of device 10. In certain implementations, interior rib 32 may extend longitudinally towards the ends 14 of the device 10. In some embodiments, as shown in FIG. 5, the rounded backside of handle 22 does not extend to create interior rib 32, but rather stands alone as a rounded handle. As shown in FIG. 6, the interior rib 32 may act simultaneously as rounded backside of the handle 22 and the interior rib 32. Such functionality and orientation of interior rib 32 highlights the elegance of the design and the efficiency of the manufacturing method described herein. In the light of the benefits of the interior rib 32 as disclosed herein, one of ordinary skill in the art would appreciate that various implementations of interior rib 32 are possible, including implementations with an adjusted size, radius, or shape.

Figure 7:
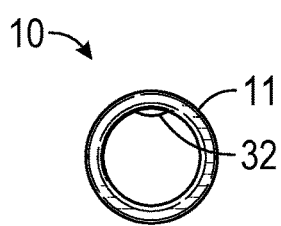
FIG. 7 illustrates a top view of the device with an interior rib in accordance with the various embodiments disclosed herein.

FIG. 7 illustrates a top view of device 10. In this view, interior rib 32 protrudes past the interior surface 30 of the body 11, thus providing additional weight concentrated on the perimeter of the body 11 and a rounded backside to the handle 22.

Figure 8C:
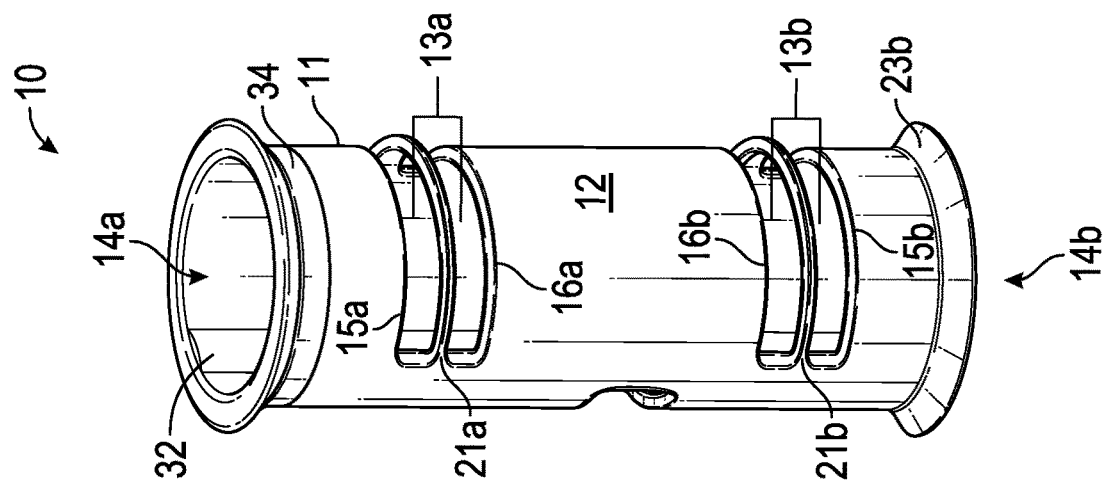
FIGS. 8A-8C illustrate possible sizes of device in accordance with the various embodiments disclosed herein.
Figure 8B:
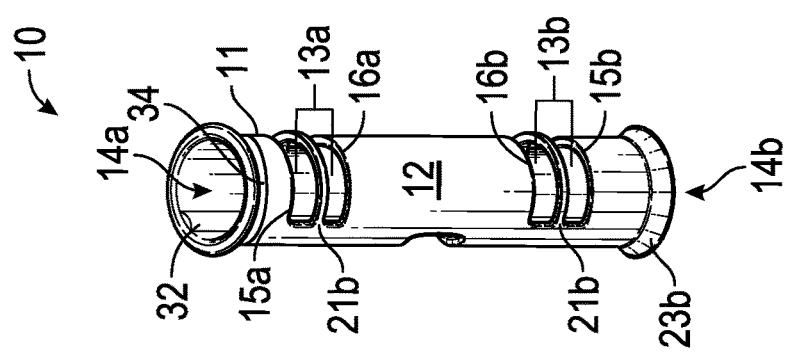
Figure 8A:
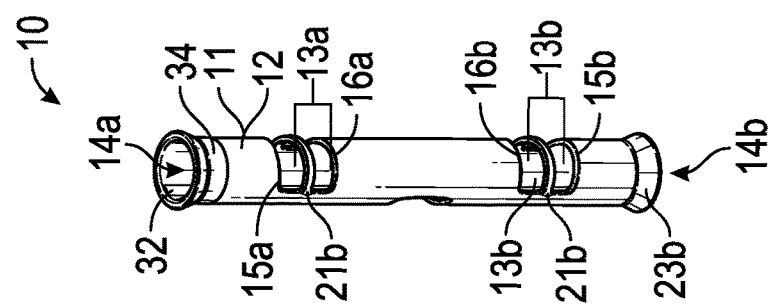

FIGS. 8A-8C illustrate various possible shapes and sizes for device 10. In embodiments, the device 10 may be made available in different sizes and different weights. For example, the device 10 may be available in three different sizes: small, medium, and large. The small size may have three different weights (4 kg, 6 kg, 8 kg), the medium size may have three different weights (10 kg, 12 kg, 16 kg), and the large size may have two different weights (20 kg, 32 kg). Different sizes and weights are made to accommodate different body sizes and strength of the users, as well as different exercises or routines.

The illustration of the embodiments of FIGS. 8A-8C are not intended to limit the disclosure, but rather illustrative of the fact that the device 10 may embody different heights, radius, and weights. For example, the device 10 shown in FIG. 8B may have a radius of 1.5 times the radius of the device 10 shown in FIG. 8A. However, as one of ordinary skill in the art would appreciate, variations in size, weight, height, and radius may be implementation-specific, and adjustments to the size, weight, height, and radius may be implemented without taking away from the various patentable features of the disclosure set forth herein. Further the illustrations shown in FIGS. 8A-8C are not intended to represent any definitive relationship between the size of the body 11 and the other features of the device 10, such as at least the flared ends 23, the handles 21 or 22, the apertures 13 and 17, and the distances between the features, respectively. Indeed, and as discussed herein, the specific dimensions of the features may be implementation-specific. For example, while the large embodiment shown in FIG. 8C illustrates proportionally large apertures 13 and handles 21, one of ordinary skill in the art would appreciate that various sizes for those features are possible, including but not limited to the sizes shown in small sized embodiment (FIG. 8A) and the medium sized embodiment (FIG. 8B).

In an illustrative embodiment, and by way of example only, the dimensions of the 10 kg unit may be: 1187.45 mm in length, 222.25 mm in outside diameter, and 174.88 mm in inside diameter. As shown herein, apertures 13 may be bisected by a handle 21. Accordingly, apertures 13 may have two portions. By way of example only, the substantially rectangular portion of apertures 13 may have dimensions of 134.54 mm in length and 63.50 mm in width. The portion of apertures 13 with a rounded edge in the form of crescent may have a similar length and the width may be 69.91 mm taken at the top of the arc to the handle 21 at a right angle. The handle 21 may be 28.58 mm in thickness. The additional aperture in the back may have two portions of the same shape and size on either side of handle 22, the length of each portion of the aperture may be 152.40 mm, and the width may be 55.25 mm. The handle 22 may be 28.58 mm in thickness. As one of ordinary skill in the art would appreciate in light of this disclosure, various weights and sizes may be implemented consistent with the embodiments disclosed and claimed herein. As one of ordinary skill would appreciate, increasing the size of any of the dimensions of device 10 does not necessarily increase the size of all of the features of device 10 to the same scale. Indeed, one may be motivated to increase the diameter and weight of the device 10, but not to change the dimensions of the handles or apertures.

Figure 9:
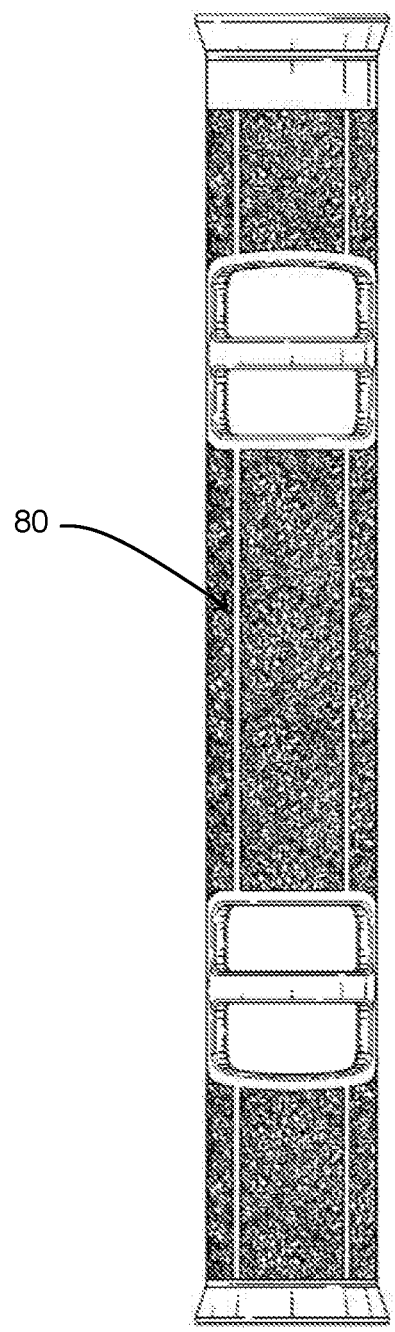
FIG. 9 illustrates a front view of the device with a textured surface in accordance with the various embodiments disclosed herein.

FIG. 9 illustrates a device 10 with a surface texture 80 on the exterior surface 12 of the body 11 of device 10. In certain implementations, surface texture 80 may substantially cover the exterior surface 12 such that a user may conveniently grip the textured surface at any location along the body 11. In some implementations, surface texture 80 may cover the band 34 and flared ends 23. In implementations, certain portions of exterior surface 12 may not have a textured surface to permit the use of logos or other aesthetic designs, without defeating the purpose of surface texture 80 of providing substantial coverage of the exterior surface 12. As one of ordinary skill in the art would appreciate, substantial coverage of the exterior surface 12 may require at least enough surface texture 80 on the exterior surface 12 to accommodate the anticipated use of device 10.

For example, as shown in FIG. 9, the exterior surface 12 may contain thin vertical lines that do not comprise a surface texture 80. As one of ordinary skill in the art would appreciate, exterior surface 12 may still be substantially covered with a surface texture 80 notwithstanding such features. In specific implementations, substantial coverage of the exterior surface 12 may mean that at least 90% of the surface area of exterior surface 12 comprises a surface texture 80.

As discussed above, the present disclosure solves challenges faced by prior solution by creating curved apertures 13 and flared end 23. Namely, the present disclosure creates more possibilities for interacting with the device, including hand positions that involve the exterior surface 12 to a greater extent than prior art solutions. For example, a user may grip the exterior surface 12 with both hands, one hand, or a partial hand in combination with one or more of the handles, flared ends, and the aperture sides. Texture surface 80 increases the ability of users to grip the exterior surface, thus working with the other novel features of the present disclosure to enable a wide range of possible positions, orientations, and routines using device 10. For example, a user may grip the textured surface 80 of the device 10 in combination with one of the proximal sides 15. In light of the possible positions, orientations, and routines enabled by the present disclosure, textured surface 80 facilitates the use of device 10 during raining conditions, in aquatic environments, and as palms become sweaty during physical exercise.

FIGS. 10-17 depict various exercises that can be performed using the exercise device 10 disclosed herein. As illustrated, the present disclosure provides an improves device which enables unconstrained, loaded movement exercises. The incorporation of curved apertures walls, flared ends, an exterior surface texture permits a variety of exercises, positions, and routines not enabled or contemplated by classical weight training or other prior devices. For example, in FIG. 10, a user 90 can lift the device 10 above the head in a similar manner to lifting a barbell and perform a squat exercise. The weight of the device is concentrated on the external surface and spread throughout the body of the device, thereby reducing the load on the wrists. In contrast, a typical barbell has weight concentrated at the ends of the load, thus maximizing the load on the wrists. As depicted, user 90 may grip the device 10 at the flared ends 23. Unlike prior art solutions, the flared ends 23 act as additional handles at the extreme ends of the device 10, thus permitting exercises requiring a wide arm position such as the position depicted in FIG. 9

Figure 11:
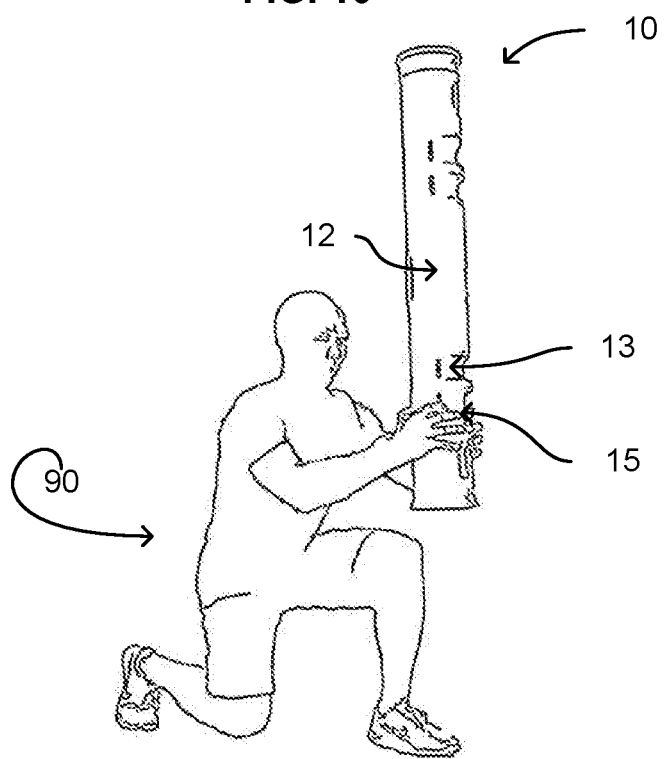
FIG. 11 illustrates a second exercise position using the device in accordance with the various embodiments disclosed herein.

FIG. 11 illustrates a user 90 holding device 10 in a vertical position by gripping both hands around the circumference of exterior surface 12. In this position, the device 10 provides narrowly concentrated weight between the user's 90 hands. Such positions would ordinarily be impossible or undesirable without a surface texture on the exterior surface 12. As disclosed herein, surface texture 80 may facilitate the gripping of the exterior surface 12, enabling positions such as the one shown FIG. 10. Further, user 90 may insert a portion of a hand inside of aperture 13. In certain positions enabled by the surface texture 80, a user 80 may desire to grip or interact with proximal side 15 of aperture 13. As disclosed herein, the curved shape of proximal side 15 may accommodate such positions not foreseen by prior art solutions.

Figure 12:
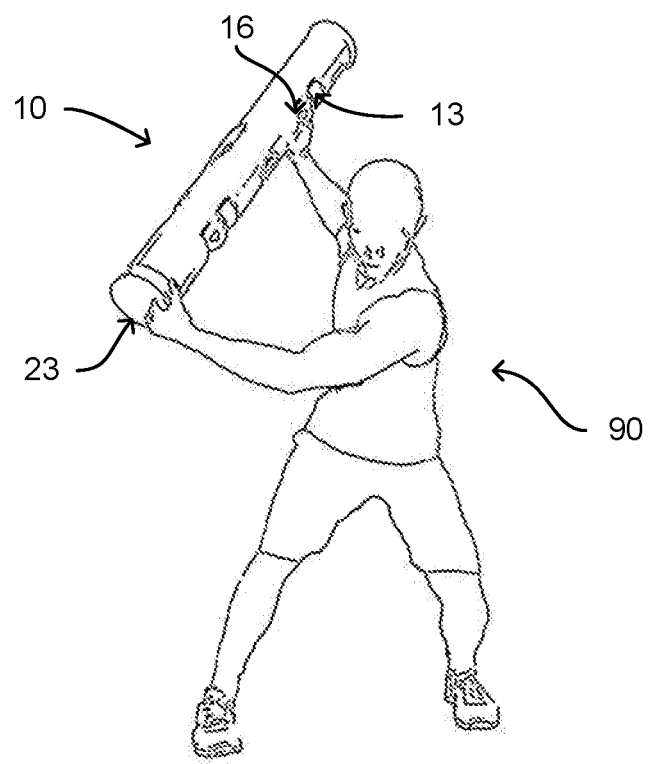
FIG. 12 illustrates a third exercise position using the device in accordance with the various embodiments disclosed herein.
Figure 13:
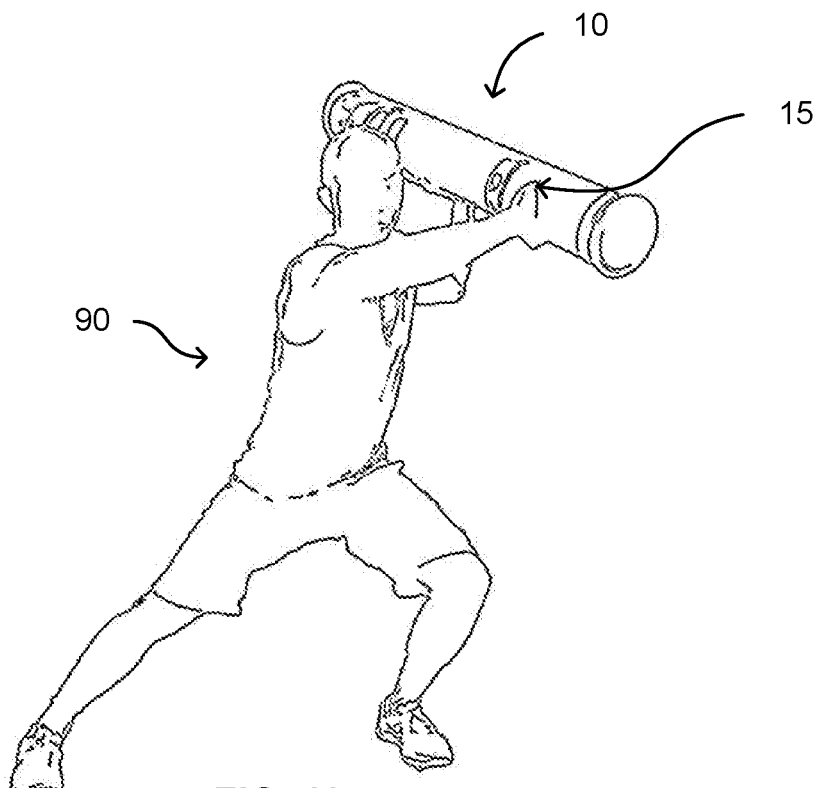
FIG. 13 illustrates a fourth exercise position using the device in accordance with the various embodiments disclosed herein.

FIG. 12 illustrates a user 90 holding the device 10 by the flared end 23 with one hand and by the distal side 16 of aperture 13 with the other hand. As shown in FIG. 12, flared end 23 provides a comfortable and stable grip for the user's 90 hand and thumb. With the addition of flared ends 23 on device 10, user 90 has a greater degree of hand positions and flexibility in their range of motion. For example, the user 90 may grab both flared ends 23 at once for a wide posture, or grab the proximal 15 or distal 16 sides of either apertures 13 for an intermediate posture. As further shown in FIG. 13, user 90 may even grab the suitably shaped proximal side 15 in combination with the exterior surface 12. With this degree of flexibility, user 90 is better able to rotate or bend the body, walk, run, or move up and down with the device 10.

Figure 14:
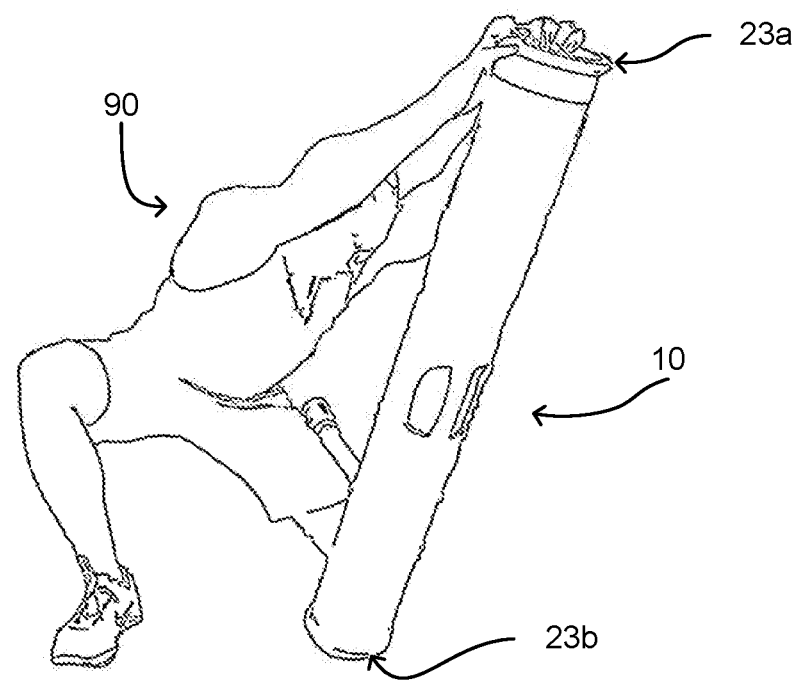
FIG. 14 illustrates a fifth exercise position using the device in accordance with the various embodiments disclosed herein.

FIG. 14 illustrates device 10 standing upright at an angle making contact with the floor at flared end 23b. In such an orientation, user 90 is able to grip and apply weight to flared end 23a, using device 10 as a flexible and movable structure for a stretching position. As explained above, flared ends 23 allow device 10 to stand upright. Further, flared ends 23 enable device 10 to stand firmly at an angle and swivel to different positions and angles. The material properties of TPE's, as disclosed herein, further permit postures and positions such as the one shown in FIG. 14 that would otherwise compromise the structural integrity of prior solutions. During other routines, user 90 may flip the device 10 using the bottom flared end 23b.

Figure 15:
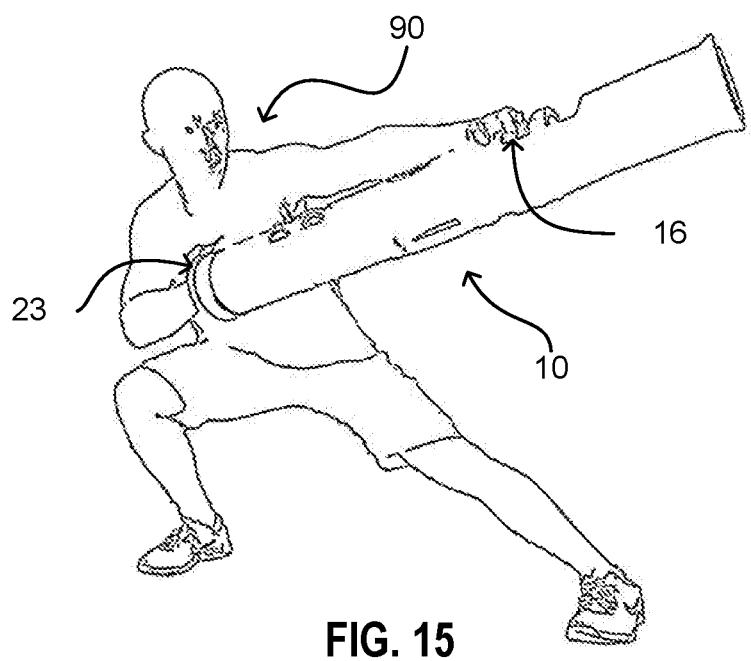
FIG. 15 illustrates a sixth exercise position using the device in accordance with the various embodiments disclosed herein.

FIG. 15 illustrates user 90 holding device 10 in a position suitable for quick action, ballistics training. As shown, the aperture 13. In such position, as shown, user's 90 thumb may grip the flared end 23 providing greater stability for exercises requiring quick, repetitive movement. The device 10 therefore allows user 90 to perform a variety of exercises not contemplated or achieved with prior art solutions.

Figure 16:
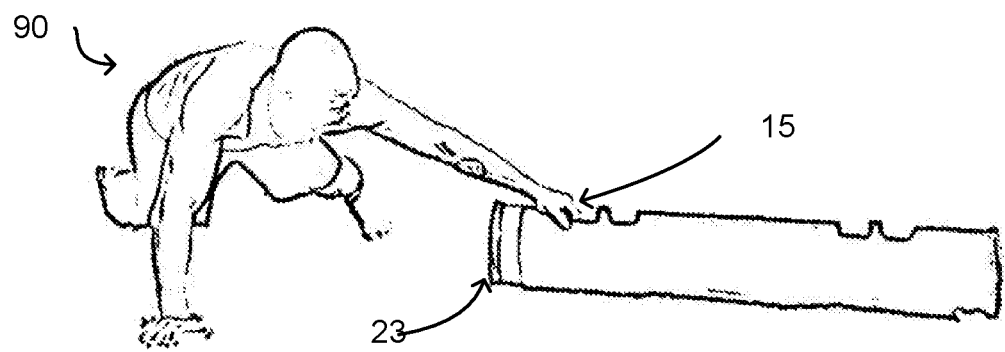
FIG. 16 illustrates a seventh exercise position using the device in accordance with the various embodiments disclosed herein.

FIG. 16 illustrates user 90 gripping proximal end 15 while the device 10 rests on the floor. User 90 is able grip the proximal side 15 of aperture 13 conveniently because of its suitable shape, as discussed herein. Additionally, flared ends 23 allow the device 10 to roll while on the floor, permitting user 90 to dynamically interact with the device 10 while in a push-up position.

FIG. 17 illustrates user 90 holding the device 10 above the head by gripping a distal side 16 of aperture 13 and a flared end 23. As shown, flared end 23 provides the user 90 with a secure grip for over-the-head, loaded movement of the device 10.

Figure 18:
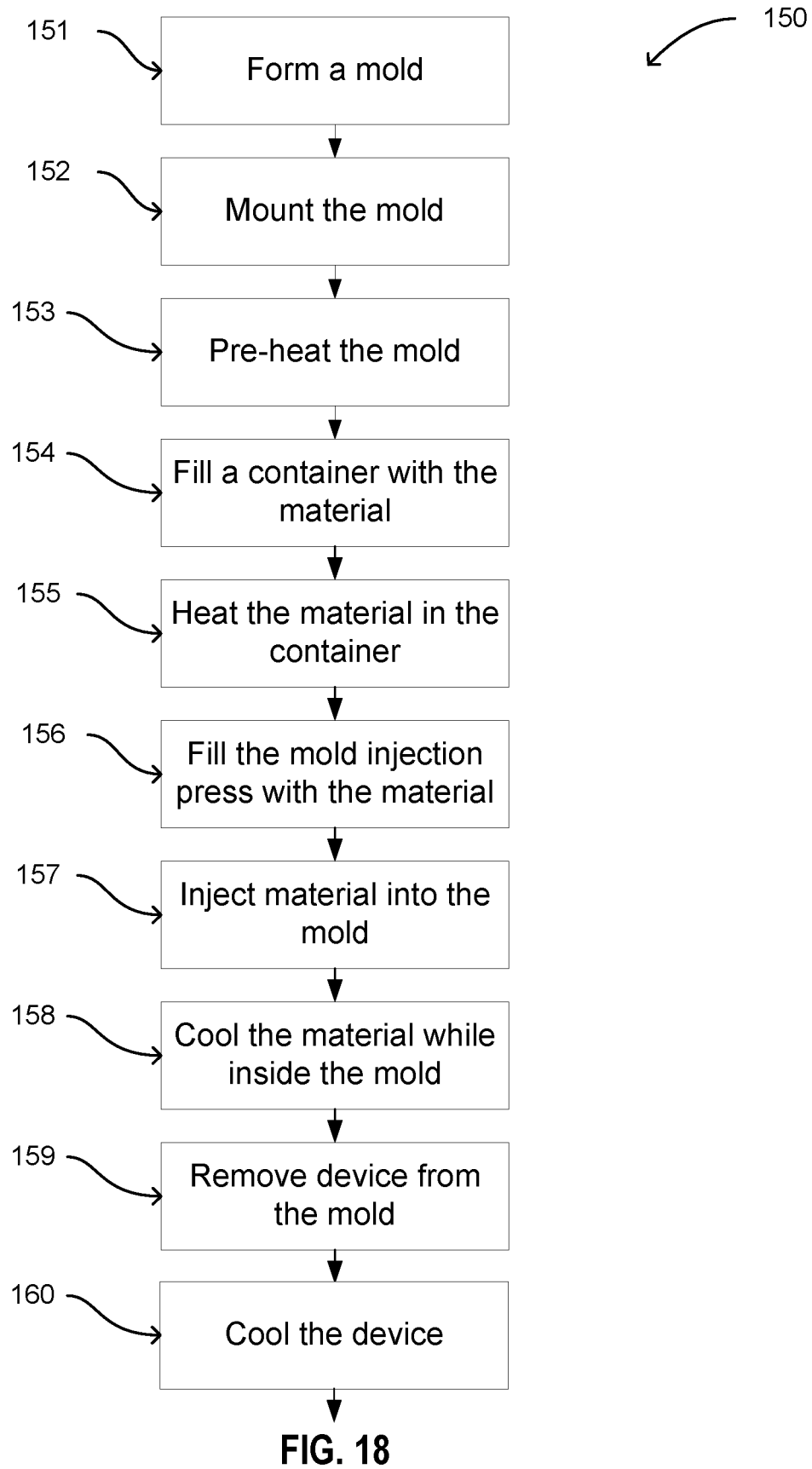
FIG. 18 describes a method for manufacturing the device.

FIG. 18 describes a preferred method 150 of manufacturing device 10. As described below, the device 10 as described herein may be manufactured by an injection molding process. The injection molding process may involve the use of a mold having projections to form the various features described herein. The term "projection" is not intended to necessarily define an outward projection, but rather may include inward depressions, as would be consistent with the various embodiments described herein. To the extent the exact shape of the mold and projections are not explicitly described below, the mold and projections may be shaped to reflect the features of device 10 as described and claimed herein. The various steps of the method described below should be considered in all respects as illustrative and not restrictive.

In step 151 a mold may be formed of a substantially cylindrical tubular body comprising two flared ends and one or more projections on an exterior surface of the body, wherein the body is centered about a longitudinal axis. In implementations, the mold may be configured to receive a cylindrical core. In implementations, the hollow portion of the tubular body may be formed from the cylindrical core. In embodiments, the mold and core may comprise one or more projections thereon to form the shape or negative space of the various features of device 10.

In implementations, a projection may be a protrusion extending from the mold or the cylindrical core. For example, the mold may comprise a first projection to form a first aperture spanned by a first handle, as described herein. The first projection may comprise two separate projections that together, form a single aperture spanned by the first handle. In embodiments, the first handle may comprise an arc extending from the body and centered about the longitudinal axis. In implementations, the mold may comprise a second projection to form a second aperture spanned by a second handle extending from the body, wherein the second handle is substantially parallel to the longitudinal axis. The second projection may comprise two separate projections that together, form a single aperture spanned by the second handle. The mold may comprise any number of first or second projections. In a specific embodiment, the mold may comprise two first projections aligned along the surface of the core of the mold in a direction parallel to the longitudinal axis and one second projection on the opposite side of the core longitudinally intermediate to the first projections.

In implementations, the projection forming the second handle may be shaped to form a curved interior rib on the backside of the second handle that protrudes radially inward towards the longitudinal axis. For example, the second handle may have a rounded backside to increase the comfort and stability of the second handle. In certain implementations, the interior rib may extend towards the ends of the mold in a direction parallel to the longitudinal axis.

In implementations, the mold may comprise a substantially circular projection to form a substantially circular indentation on the surface of device 10. In certain embodiments, substantially circular projection may be configured to be quickly removed and replaced. Such a projection may be suitable for inserting a logo or other graphical feature and changing the logo for each subsequent manufacture.

In implementations, the mold may comprise a projection of a band along the circumference of the core of the mold. In certain implementations, the band may be located at the base of one of flared ends. In embodiments, the projection may be in the form of an indentation for receiving a removable band. In various embodiments, the mold may comprise a projection to form a texture on the exterior surface of the body. In implementations, the projection forming the texture of the body may comprise a surface relief on the mold. Such a texture may designed to improve the grip on the surface of the device 10. As one of ordinary skill in the art would appreciate, various surface reliefs, surface patterns, finishes, or projections may be applied to the mold to create a texture suitable for gripping, including, but not limited to surface finishes made by sandpaper, machine etching, grit stone, and blasting.

In implementations, the mold may be formed from two separate halves. In such embodiments, the first half and second half may be mechanically configured to couple together. For example, the first half of the mold may comprise a mold of a semi-circular tube comprising one or more projections and the second half of the mold may comprise a mold of a semi-circular tube comprising one or more projections. In certain embodiments, the projections on the first and second halves of the mold may differ. For example, the first half of the mold may comprise the projections of one or more first projections, as discussed herein, and the second half of the mold may comprise one or more second projections, as discussed herein. In implementations, both halves of the mold may be shaped to form the flared ends.

In implementations, the first half of the mold may comprise a flat surface with various projections shaped to fit a complementary surface of the second half of the mold comprising projections with an inverse shape. In such embodiments, the halves of the mold may be pressed together to form a seal for the injection molding process.

In step 152 the mold may be mounted in preparation for injection molding. The mold may be positioned vertically or horizontally within an injection molding press. In certain implementations, lines carrying water may be configured to cool the mold while positioned within the press. In embodiments, the injection molding press may be configured to operate with a vacuum system and supply hopper for receiving material injected into the mold. In implementations, mounting the mold comprises pressing a first half and a second half of the mold to form a sealed, single mold. Further, mounting the mold may comprise inserting the cylindrical core into the mold to form the hollow portion of the device and various features of the interior surface of the device.

In step 153 heat may be applied to the mold to prime it for injection molding. In certain implementations, electric lines may be configured to heat the mold through induction. In other implementations, the mold may be heated through thermal conduction or convection. As a person of skill in the art would appreciate, the mold may be heated while mounted on the hydraulic press or before. In an exemplary embodiment, the mold may be preheated to approximately 80 degrees Celsius. However, one of ordinary skill in the art would understand that various preheating temperatures may be possible based on at least the size of the mold, the material of the mold, and the properties of the injection materials.

In step 154 a container may be filled with the injection molding material in preparation for injection molding. In implementations, the material may be vacuumed into a container mounted onto the hydraulic press injection molding machine. In certain embodiments, vacuuming the material into a container mounted onto the hydraulic press may be performed by a vacuuming system. In implementations, the container may be configured to feed the material into an injection molding press.

In embodiments, the material may comprise pellets of a thermoplastic elastomer. The pellets may be of various degrees of granularity depending on the specific configuration of the heating press, vacuum system, injection means, and other considerations relating to the features and design of the device. TPE is a suitable material of choice of material for the method described herein and in light of the disclosure. For example, TPE material requires little or no compounding, with no need to add reinforcing agents, stabilizers or cure systems. Further, batch to batch variations in weighing and metering components are absent, leading to consistency in both raw materials and fabricated products. Additionally, TPE products have outstanding thermal properties and material stability when exposed to a broad range of temperatures and non-polar materials. TPE material also consumes less energy to produce and allows economical quality control. According to one embodiment, a thermoplastic elastomer may be selected from the group consisting of styrenic block copolymers, thermoplastic polyolefins, polyolefins blends, thermoplastic vulcanisates, thermoplastic copolyesters, and thermoplastic polyether block amides.

In some embodiments, the material may be mixed with one or more weighting agents to increase the weight or density of the device 10. In some embodiments, talc may be used as a weighting agent. As one of ordinary skill in the art would appreciate, various weighting agents with high specific gravities may be used as a weighting agent in combination with thermoplastic elastomers. In certain embodiments, the material may also be mixed with one or more dyes to give device 10 a certain color. As discussed herein, device 10 may vary in possible weights, specific gravity, and sizes.

In step 155 heat may be applied to preheat material in the container. Heat may be applied to the material to remove moisture that may interfere with the molding process. As one of ordinary skill in the art, would appreciate, the amount of moisture on the material may depend on factors such as, the location, the level of humidity in the air, the amount of material, or other factors. In certain embodiments, sufficient heat is applied to the material to remove all moisture. In a specific implementations, the material may be heated to approximately 90 degrees Celsius to remove moisture.

In step 156 the mold injection press may be filled with the material. In implementations, the material may be transported from the container to the injection press by a supply hopper or a vacuum. One of ordinary skill in the art would appreciate that there may exist various methods to fill a mold injections press with material for injection molding.

In step 157, the material may be melted and injected into the mold. In certain embodiments, the material may be heated to a temperature sufficient to melt the specific material used in the manufacture. As one of ordinary skill in the art would appreciate, the temperature to melt the material may be dependent on the material formulation, which may vary from case to case depending on the desired material properties, such as rigidity or weight. In certain implementations, the melt temperature may range from 177 degrees Celsius to 232 degrees Celsius. Injecting the material into the mold may comprise applying pressure to the material. In certain embodiments, a press or ram may force material into the mold through a small gate, nozzle, or spout. In specific implementations, the injection pressure may range from 5,000 psi to 15,000 psi. As one of ordinary skill in the art would appreciate, the melting temperature and injection pressure may depend on the material used in the injection molding and other characteristics, such as the material density. In implementations, the mold may be filled entirely with the molten material.

In step 158 the molten material may be cooled inside of the mold. As one of ordinary skill in the art would appreciate, the hold time for cooling injected material may depend on at least the mass of material, the material density, and in the case of a tubular device, the wall thickness. In embodiments, the material may be allowed to cool until it is in a solid form. In specific embodiments, the material may be cooled for approximately 9 to 13 minutes until it reached a temperature of approximately 80 degrees Celsius.

In step 159, the product may be removed from the mold. In implementations, axial force may be applied to remove the core from the mold. In embodiments, the first half and second half of the mold may be separated to remove the product. In certain embodiments, a mechanical device configured to apply axial force to the remove the cylindrical core from the mold.

In step 160 the material may be allowed to cool to solidify the material. In a specific embodiment, the material may be cooled at ambient temperature for 1 to 3 hours until it is sufficiently hardened.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

As used herein, the verb "to comprise" in this description, claims, and other conjugations are used in its non-limiting sense to mean those items following the word are included, but items not specifically mentioned are not excluded.

Reference to an element by the indefinite article "a" or "an" does not exclude the possibility that more than one of the elements are present, unless the context clearly requires that there is one and only one of the elements. The indefinite article "a" or "an" thus usually means "at least one." Additionally, the words "a" and "an" when used in the present document in concert with the words "comprising" or "containing" denote "one or more."

As used herein in the specification and claims, including as used in the examples and unless otherwise expressly specified, all numbers may be read as if by prefaced by the word "about" or "approximately," even if the term does not expressly appear. The phrase "about" or "approximately" may be used when describing magnitude and/or position to indicate that the value and/or position described is within a reasonable expected range of values and/or positions.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be terms a second element, region, layer, or section without departing from the teachings of the embodiments.

In the specification and drawings herein, like numerals depict like parts, portions, elements, regions, or sections. The word "end" as used herein means the two extreme sides of the body of the exercise device 10 where the tubular body ends. The word "longitudinal" refers to the axis of an object that is the longest among all three dimensions of the object. The word "radial" refers to the axis that is perpendicular to the longitudinal axis. The word "distal" refers to the point that is further away from the reference point as compared to another point on the same straight line. For example, when the side of an aperture is said to be situated distally from the end, it is further away from that end as compared to the other side of the aperture when both sides are on the same line of direction from the end. The word "proximal" refers to the point that is closer to the reference point as compared to another point on the same straight line.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary illustrations and block diagrams. As will become apparent to one of ordinary skill in the art after reading this document, the illustrated embodiments and their various alternatives can be implemented without confinement to the illustrated examples.

The invention claimed is:

1. A device for use in physical exercise, the device comprising:
   a substantially cylindrical tubular body centered around a longitudinal axis, the body having one or more flared ends and an exterior surface, wherein the flared ends of the body extend radially outward from the longitudinal axis, wherein the flared ends have raised edges such that a diameter at an outermost plane of the flared ends is larger than a diameter of the tubular body, wherein the body comprises:
   a plurality of first apertures axially aligned on the exterior surface of the body and, wherein each first aperture is spanned by a first handle comprising an arc intersecting each aperture and centered around the longitudinal axis; and
   a second aperture on the exterior surface of the body, wherein the second aperture is spanned by a second handle parallel to the longitudinal axis, wherein the second handle intersects the second aperture.

2. The device of claim 1, wherein the second handle of the second aperture comprises an exterior handle surface that extends beyond the exterior surface of the body, and a curved interior rib that protrudes towards the longitudinal axis.

3. The device of claim 2 wherein the curved interior rib extends towards the first and second flared ends in a direction parallel to the longitudinal axis.

4. The device of claim 1, further comprising a band disposed on the exterior surface of the body adjacent to one of the flared ends, wherein the band has a color different than a color of the exterior surface to indicate a weight.

5. The device of claim 4, further comprising an indentation on the exterior surface of the body to accommodate the band, such that an exterior surface of the band is substantially coplanar with the exterior surface of the body.

6. The device of claim 1, wherein the flared ends extend radially outward at 26 degrees from the longitudinal axis.

7. The device of claim 1, wherein the flared ends extend radially outward at an angle between 20 degrees and 30 degrees from the longitudinal axis.

8. The device of claim 1, wherein the flared ends extend radially outward at an angle between 5 degrees and 60 degrees from the longitudinal axis.

9. The device of claim 1, wherein the exterior surface of the body comprises a texture to facilitate gripping.

10. The device of claim 1, wherein the plurality of first apertures each comprise a first side closest to a proximal end of the body and a second side furthest from the proximal end of the body, wherein the first side forms a curve with a crescent indentation towards the proximal end.

11. The device of claim 1, wherein the first handle of one of the plurality of first apertures further comprises an interior handle surface substantially coplanar with an interior surface of the body and an exterior handle surface substantially coplanar with the exterior surface of the body.

12. The device of claim 1, wherein the first handle of one of the plurality of first apertures further comprises an interior handle surface substantially coplanar with an interior surface of the body and an exterior handle surface raised above the exterior surface of the body.

13. The device of claim 1, wherein the device is comprised of a thermoplastic elastomer.

14. A device for use in physical exercise, comprising:
   a substantially cylindrical tubular body centered around a longitudinal axis having two ends and an exterior textured surface, wherein the two ends are flared ends that extend radially outward from the longitudinal axis, wherein the flared ends have raised edges such that a diameter at an outermost plane of the flared ends is larger than a diameter of the tubular body;
   a plurality of first apertures axially spaced on the exterior surface of the body, wherein each first aperture comprises a first handle spanning across the first aperture and centered around the longitudinal axis;
   a second aperture on the exterior surface of the body, wherein the second aperture is spanned by a second handle parallel to the longitudinal axis, wherein the handle of the second aperture comprises a curved interior rib that protrudes towards the longitudinal axis, and wherein the curved interior rib extends towards the two ends along an interior surface of the body in a direction parallel to the longitudinal axis to increase the rotational stability of the device.

15. The device of claim 14, wherein an aperture of the plurality of first apertures comprises a first side closest to a proximal end of the body wherein the first side forms a curve with a crescent indentation towards the proximal end to facilitate the insertion of a hand into the aperture.

16. The device of claim 14, wherein the first handle of one of the plurality of first apertures further comprises an interior handle surface substantially coplanar with the interior surface of the body and an exterior handle surface substantially coplanar with the exterior surface of the body.

* * * * *